(12) United States Patent
Piovanelli et al.

(10) Patent No.: US 9,671,903 B1
(45) Date of Patent: Jun. 6, 2017

(54) MODULAR OPTICAL TOUCH PANEL STRUCTURES

(71) Applicant: Sensing Electromagnetic Plus Corp., Palo Alto, CA (US)

(72) Inventors: Matteo Piovanelli, Palo Alto, CA (US); Alessandro Levi, Palo Alto, CA (US); Silvano Furlan, Palo Alto, CA (US)

(73) Assignee: Sensing Electromagnetic Plus Corp., Palo Alto, CA (US)

( * ) Notice: Subject to any disclaimer, the term of this patent is extended or adjusted under 35 U.S.C. 154(b) by 34 days.

(21) Appl. No.: 14/580,164

(22) Filed: Dec. 22, 2014

Related U.S. Application Data

(60) Provisional application No. 61/920,431, filed on Dec. 23, 2013.

(51) Int. Cl.
*G06F 3/042* (2006.01)

(52) U.S. Cl.
CPC .................... *G06F 3/042* (2013.01)

(58) Field of Classification Search
CPC ....................................... G06F 3/042
USPC ........................................ 250/349
See application file for complete search history.

(56) References Cited

U.S. PATENT DOCUMENTS

| | | | | |
|---|---|---|---|---|
| 5,016,961 A * | 5/1991 | Aldrich | ................. | H04B 10/22 250/551 |
| 8,344,325 B2 * | 1/2013 | Merrell | .................. | G06F 3/017 250/349 |
| 2009/0105605 A1 * | 4/2009 | Abreu | .................. | A61B 5/0008 600/549 |
| 2010/0171029 A1 * | 7/2010 | Lee | ..................... | G01D 5/34738 250/231.1 |
| 2011/0063213 A1 * | 3/2011 | Kang | .................. | G06F 3/03547 345/158 |
| 2011/0096033 A1 * | 4/2011 | Ko | .......................... | G06F 3/017 345/175 |
| 2011/0279414 A1 * | 11/2011 | Noma | ................... | G02F 1/1336 345/175 |
| 2011/0310126 A1 * | 12/2011 | Georgiev | ............... | G06F 3/016 345/660 |
| 2012/0162126 A1 * | 6/2012 | Yuan | ..................... | G06F 3/0412 345/174 |
| 2013/0307795 A1 * | 11/2013 | Suarez Rovere | ..... | G06F 3/0488 345/173 |
| 2014/0001349 A1 * | 1/2014 | Reime | ..................... | G01D 5/28 250/231.1 |
| 2014/0252209 A1 * | 9/2014 | Land | ....................... | G01V 8/20 250/208.2 |
| 2014/0267124 A1 * | 9/2014 | Christiansson | ......... | G06F 3/042 345/173 |
| 2014/0326882 A1 * | 11/2014 | Tar | ........................... | G01L 5/166 250/338.1 |

\* cited by examiner

*Primary Examiner* — David Porta
*Assistant Examiner* — Gisselle Gutierrez
(74) *Attorney, Agent, or Firm* — Cooley LLP

(57) ABSTRACT

An apparatus has a first ring of infrared emitters and a second ring of infrared detectors positioned adjacent to the first ring. A controller applies signals to the first ring and collects signals from the second ring.

7 Claims, 13 Drawing Sheets

MODULAR OPTICAL TOUCH PANEL STRUCTURES

CROSS-REFERENCE TO RELATED APPLICATION

This application claims priority to U.S. Provisional Patent Application Ser. No. 61/920,431, filed Dec. 23, 2013, the contents of which are incorporated herein by reference.

FIELD OF INVENTION

This invention relates generally to electronic devices. More particularly, this invention relates to modular optical touch panel structures.

BACKGROUND OF INVENTION

A number of systems in different fields can be represented as a sequence of repeated modules or units. For example, in the case of network topologies the units are referred to as nodes. Two typical examples of network topologies are the bus and the ring.

In the prior art bus topology of FIG. 1, the nodes 10 of the network are connected via a shared communication line 12 called a bus. This is the simplest and generally the easiest way to connect multiple nodes, although it requires management of collisions that happen when more than one node 10 attempts to use the bus 12 at the same time.

In the prior art ring topology of FIG. 2, each node 10 is connected to exactly two other nodes, forming a single loop 14. It is possible to imagine a ring topology as formed starting from a bus topology by connecting the last node to the first.

Either topology, or any different one, can be implemented on hardware, by physically connecting the nodes accordingly, or on a virtual layer. The latter means that for example it is possible to implement a virtual ring topology even though the nodes are actually connected on a bus topology.

It would be desirable to utilize new topologies for electronic components. More particularly, it would be desirable to provide new modular optical touch panel structures.

SUMMARY OF THE INVENTION

An apparatus has a first ring of infrared emitters and a second ring of infrared detectors positioned adjacent to the first ring. A controller applies signals to the first ring and collects signals from the second ring.

A method includes forming a serial string of infrared emitters in a first ring and constructing a serial string of infrared detectors in a second ring. The first ring is positioned adjacent to the second ring. At least one controller is attached to the first ring or the second ring.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
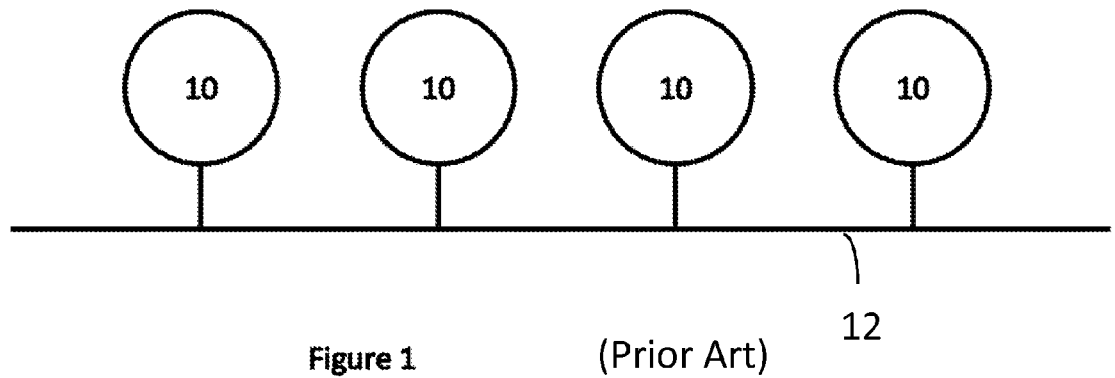
FIG. 1 illustrates a prior art bus topology.
Figure 2:
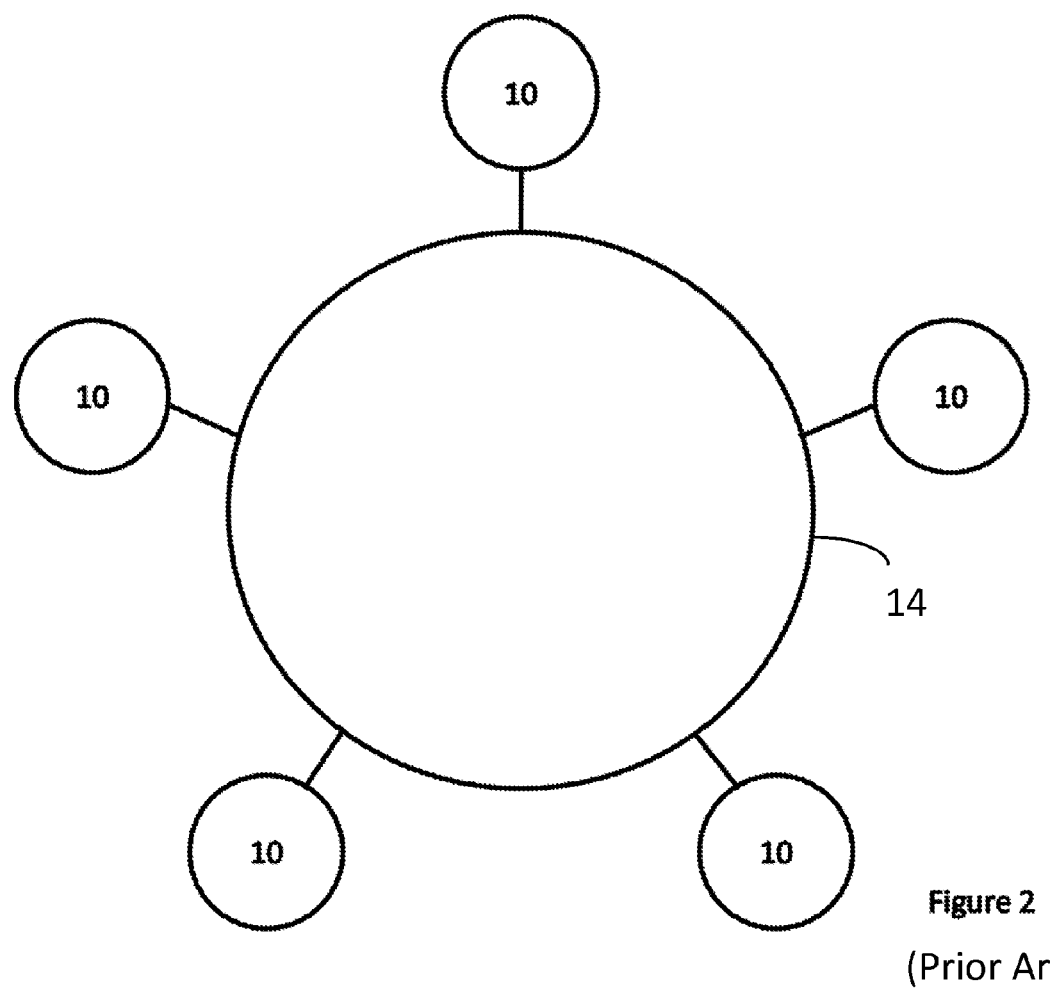
FIG. 2 illustrates a prior art ring topology.
Figure 3:
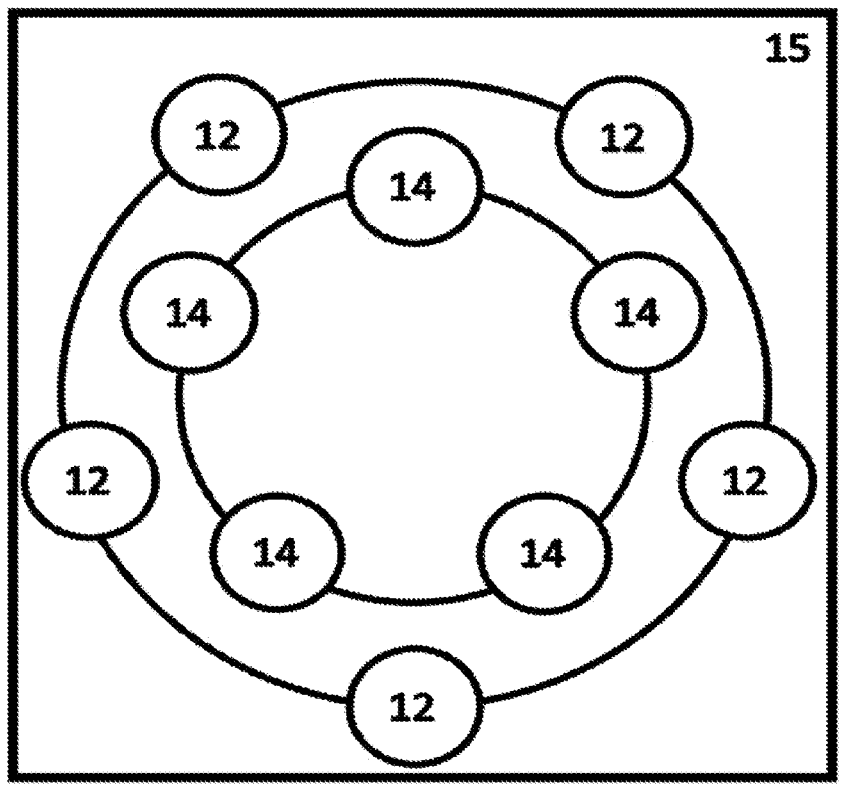
FIG. 3 illustrates a double ring topology in accordance with an embodiment of the invention.

FIG. 3 illustrates a double ring topology of infrared (IR) emitting nodes 12 and IR detecting nodes 14 encased in a deformable material 15 that allows for the evaluation of haptic pressure. This topology allows one to sequentially activate the IR emitters, and to read in sequence from the IR detectors.

Figure 4:
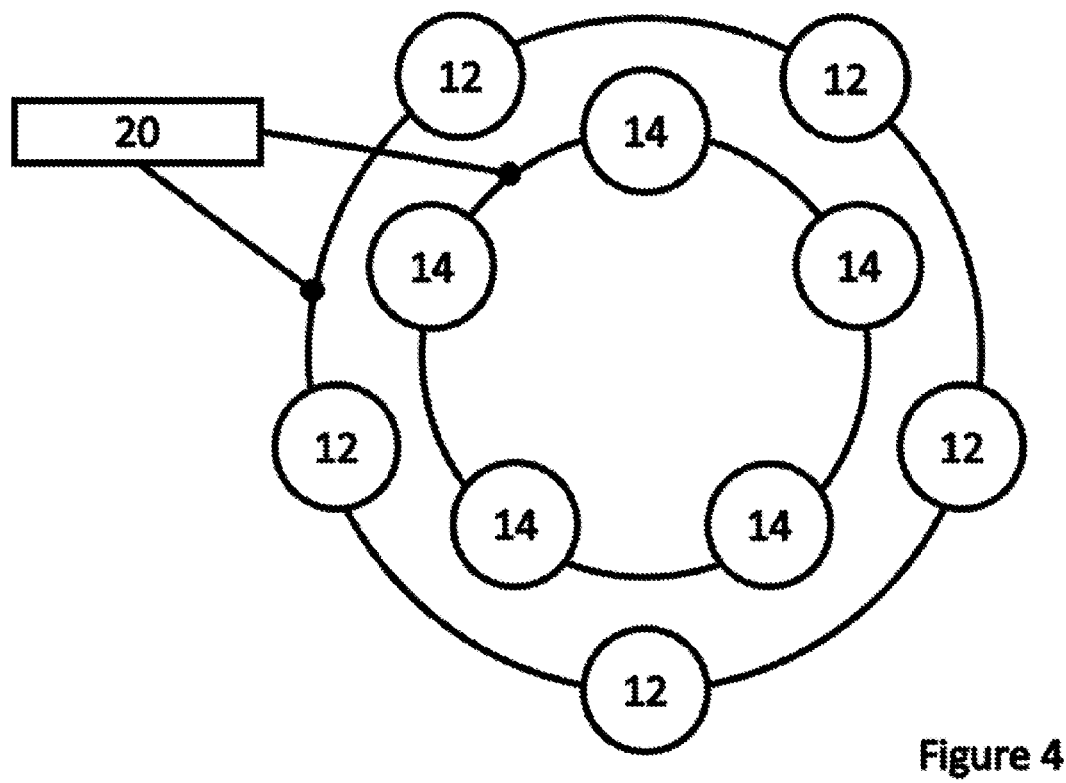
FIG. 4 illustrates a double ring topology with a control node utilized in accordance with an embodiment of the invention.
Figure 5:
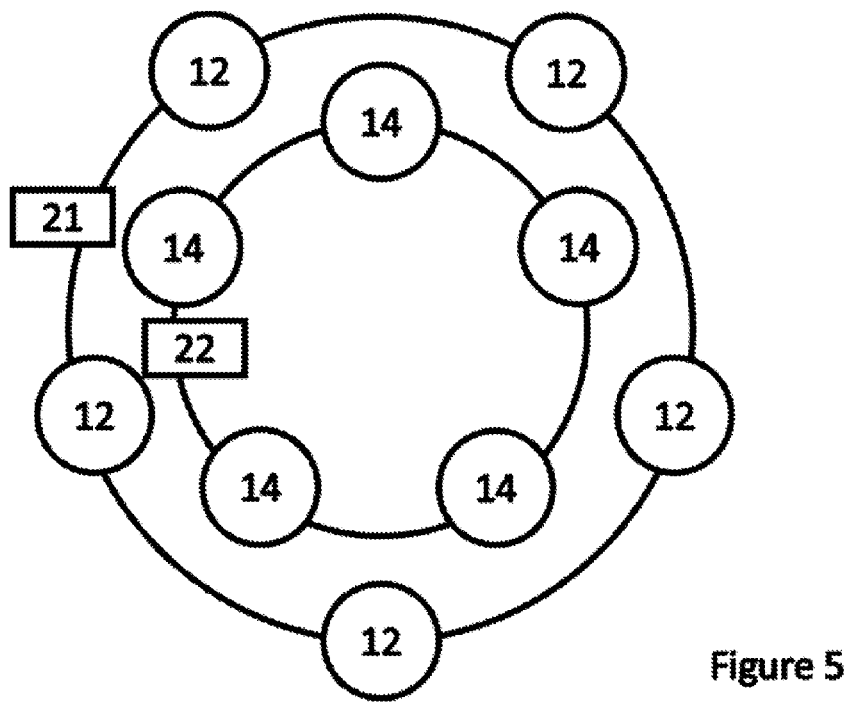
FIG. 5 illustrates a double ring topology with multiple controller nodes utilized in accordance with an embodiment of the invention.

FIG. 4 illustrates a control node 20 connected to the double ring. The control node 20 is responsible for sending the signals to activate and deactivate the IR emitter nodes 12 and to read from the IR detector nodes 14. Advantages of this configuration include:

- it is possible to count the IR emitter nodes 12 and the IR detector nodes 14;
- nodes can be seamlessly added to the system on either of the rings; and
- the controller node can be connected between any two nodes of either ring;

As shown in FIG. 5, the controller node 21 for the ring of IR emitter nodes 12 can be considered distinct from the controller node 22 for the ring of IR detector nodes 14. In some practical applications, however, the two controller nodes will need to communicate and/or be synchronized and thus it may be practical to implement them in a single device.

Figure 6:
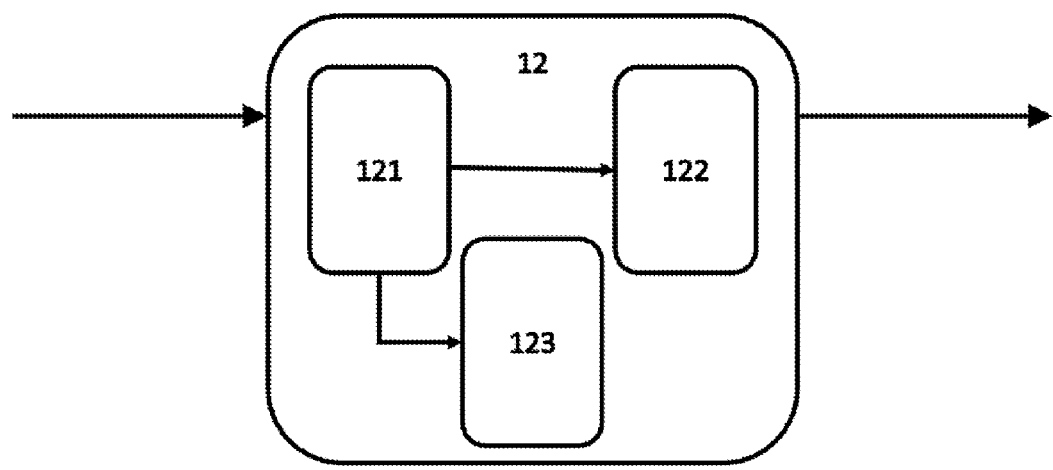
FIG. 6 illustrates an emitter node configured in accordance with an embodiment of the invention.

An IR emitter node 12 needs to be able to communicate with the ring, receiving and forwarding commands. Furthermore, such node needs to be able to opportunely emit IR light. Hence, a basic IR emitter node 12 will comprise a command-decoding element 121, a command-forwarding element 122, and an IR emitting element 123, as shown in FIG. 6.

Figure 7A:
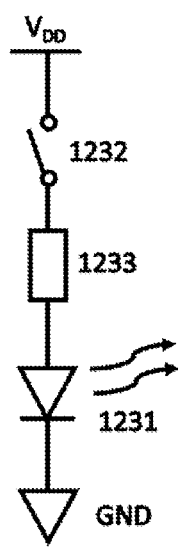
FIGS. 7(A)-7(C) illustrate emitters utilized in accordance with embodiments of the invention.
Figure 7B:
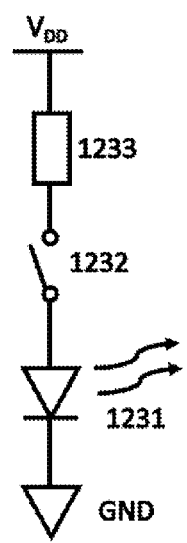
Figure 7C:
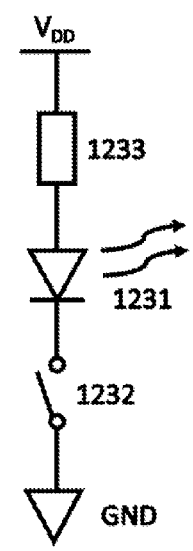
Figure 8:
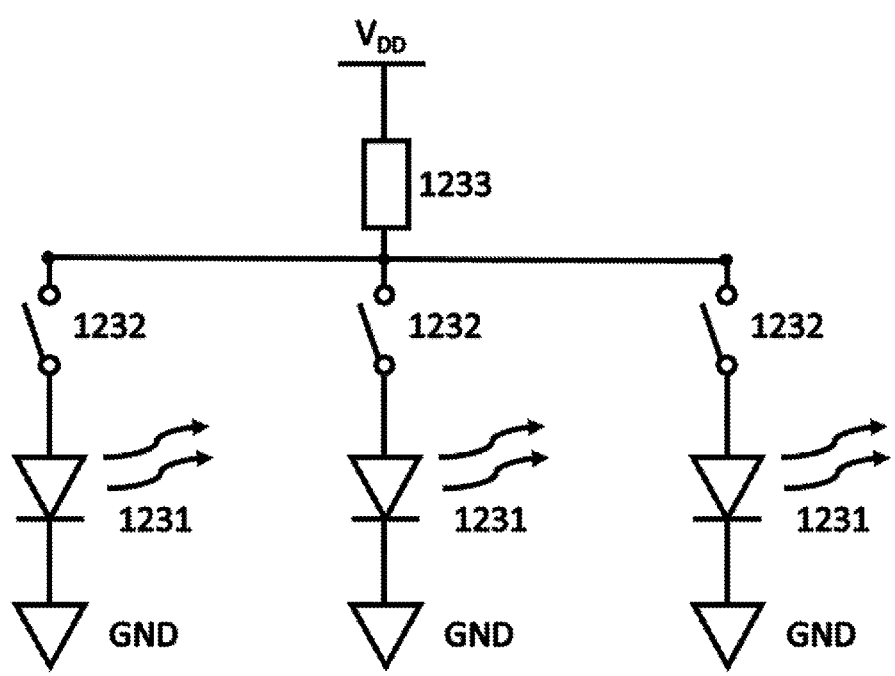
FIG. 8 illustrates emitter nodes connected in parallel.

The IR emitting element 123 will in general contain an IR emitter 1231, as shown in FIG. 7(a). A light emitting diode (LED) 1231 may be connected to a switching circuit 1232, such as a power transistor. The IR emitter 1231 may require a polarization circuit 1233, for example a resistive load. FIGS. 7(A)-(C) show three example configurations for an IR emitting element 1231. In many cases, it will be advantageous to use the configurations in FIG. 7(B) or FIG. 7(C), because the polarization circuit 1233 may be shared among many IR emitting elements, as shown in FIG. 8.

Figure 9:
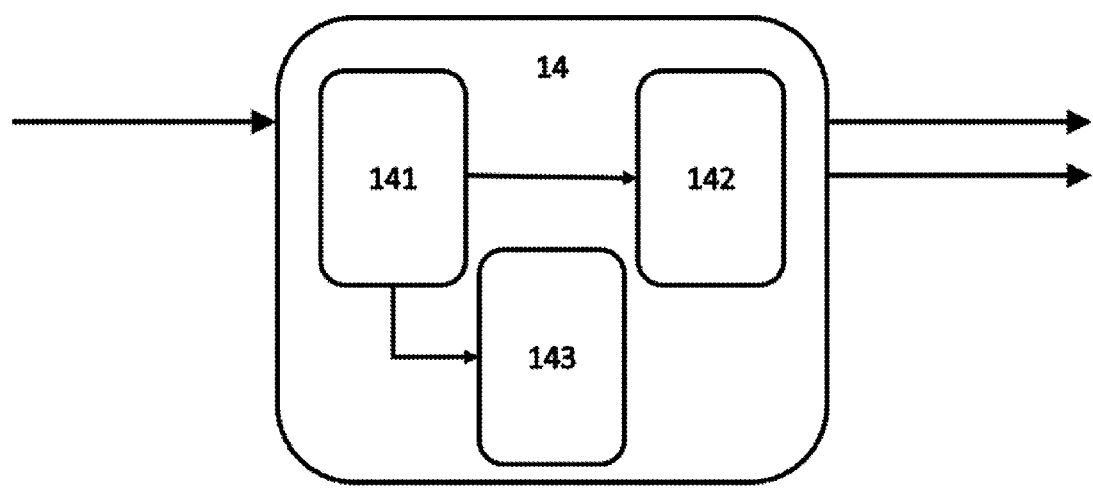
FIG. 9 illustrates a detector node configured in accordance with an embodiment of the invention.

An IR detector node 14 needs to be able to communicate with the ring, receiving and forwarding commands. Furthermore, such node needs to be able to detect IR light and convert it to an opportune signal, which the node needs to be able to send along the ring to the rest of the system. Hence, a basic IR detector node 14 will include a command-decoding element 141, a command-forwarding element 142, and an IR converting element 143, as shown in FIG. 9.

Figures 10A, 10B:
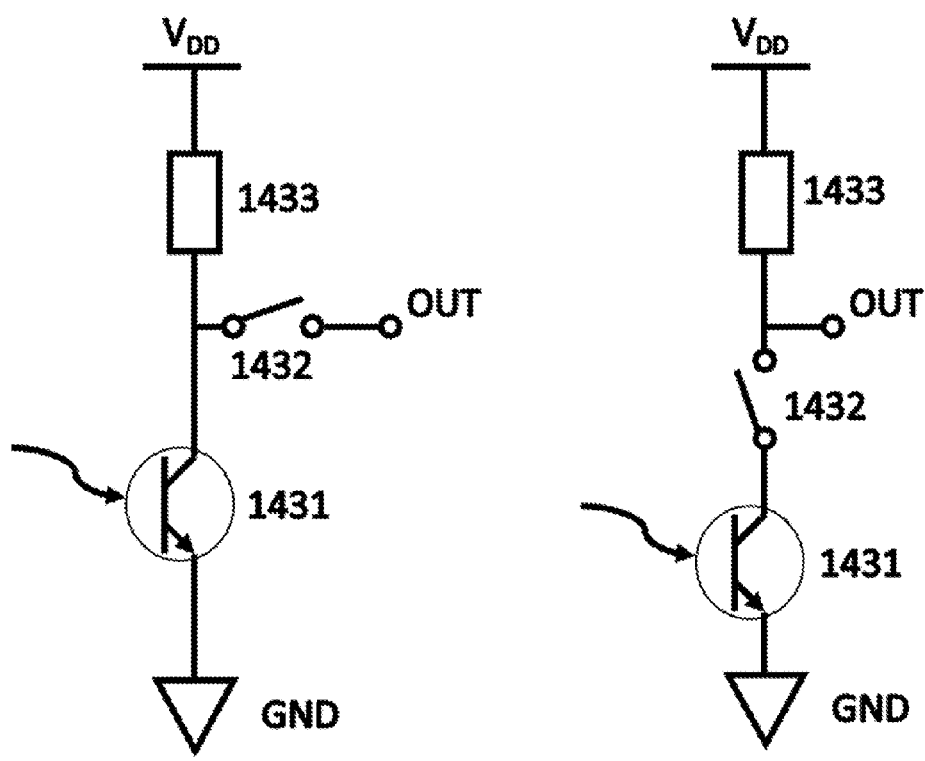
FIGS. 10(A)-10(D) illustrate detectors utilized in accordance with embodiments of the invention.
Figure 10C:
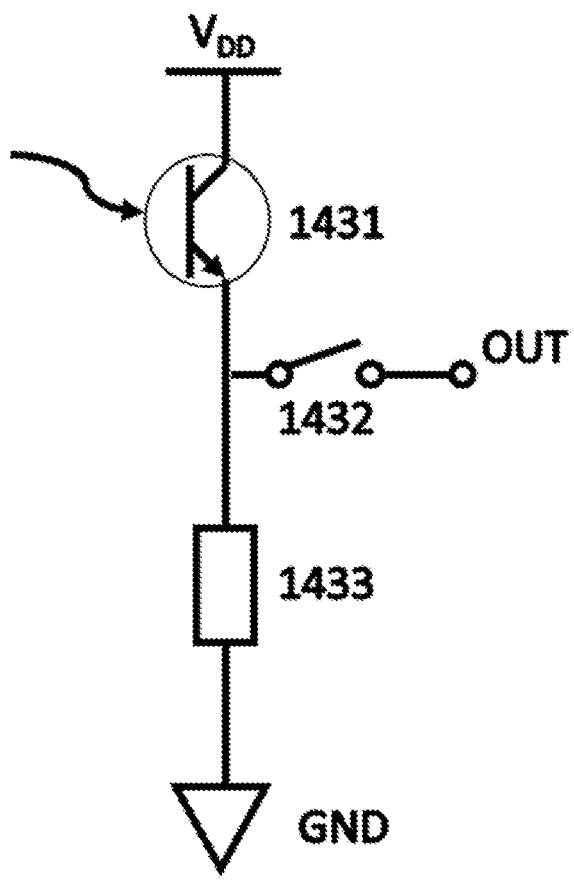
Figure 10D:
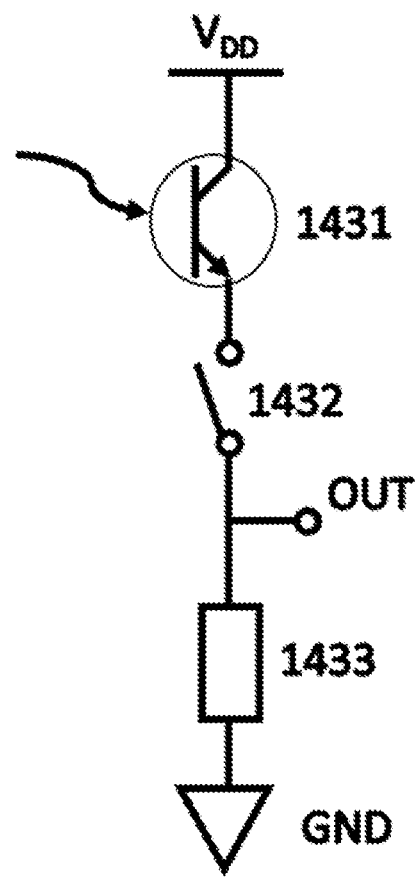
Figure 11:
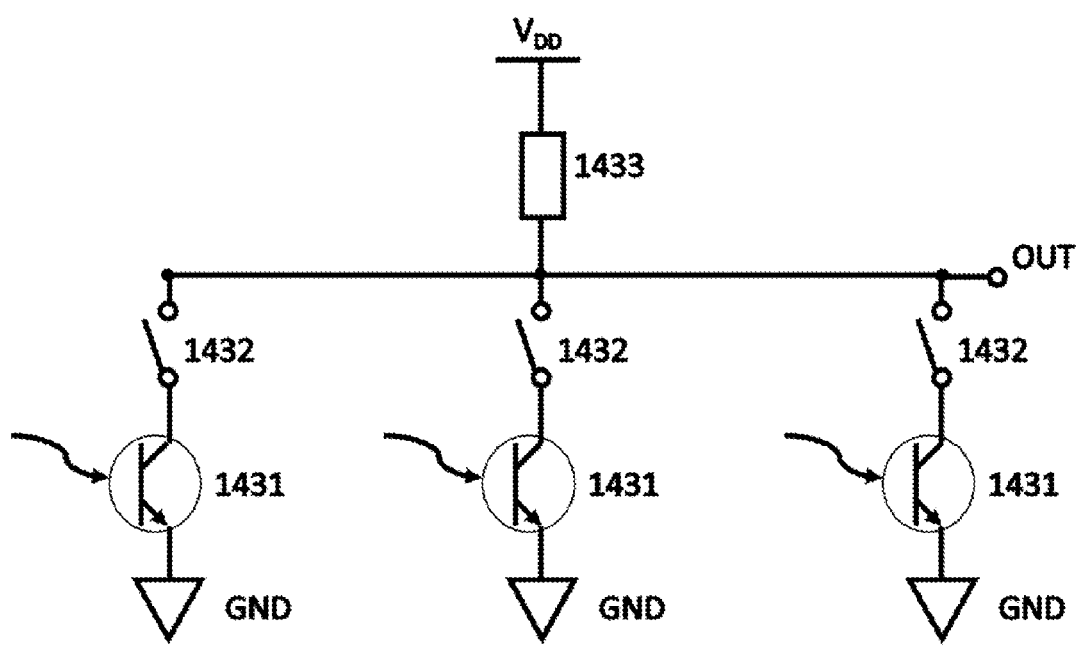
FIG. 11 illustrates detectors connected in parallel in accordance with an embodiment of the invention.

The IR converting element 143 will in general contain a circuit or structure 1431 that is able to convert the IR signal received to a signal that can be transmitted to the rest of the system. Often, this will be an electrical signal, and the structure 1431 may be a photodiode or a phototransistor, as shown in FIGS. 10(A) and 10(B). The IR converting element 143 will in general also contain a switching circuit 1432, for example a power transistor, to selectively connect the output of the structure 1431 to the rest of the system. Moreover, the IR converting element 143 will often contain a polarization circuit 1433, for example a resistive load. FIGS. 10(A) through 10(D) show four example configurations for an IR converting element 143. In many cases, it will be advantageous to use the configurations in FIG. 10(B) or FIG. 10(D), because the polarization circuit 1433 may be shared among many IR emitting elements, as shown in FIG. 11.

In the simplest case, each IR emitter node 12 contains only one IR emitting element 123, and each IR detector node 14 contains only one IR converting element 143. In those cases:

the command-decoding element 121 and the command-forwarding element 122 of the IR emitter node 12 may be implemented together as a single flip-flop;

the command-decoding element 141 and the command-forwarding element 142 of the IR detector node 14 may be implemented together as a single flip-flop.

Both these configurations would also use a timing, or clock, signal, shared among all nodes of each ring, and, optionally, a reset signal.

Different configurations are of course possible, in which, for example, each IR emitter node 12 contains more IR emitting elements 123, and/or each IR detector node 14 contains more IR converting elements 143. In these cases, the command-decoding element 121 and the command-forwarding element 122 of the IR emitter node 12 may be implemented as separate circuits. Likewise, the command-decoding element 141 and the command-forwarding element 142 of the IR detector node 14 may be implemented as separate circuits.

Figure 12:
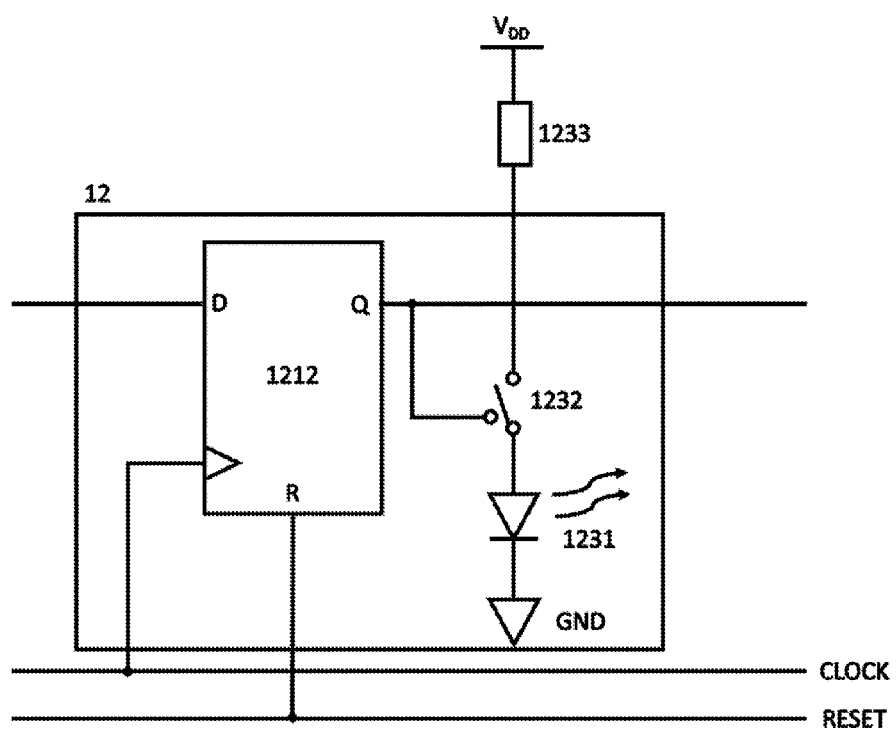
FIG. 12 illustrates an emitter node with a command-decoding element.
Figure 13:
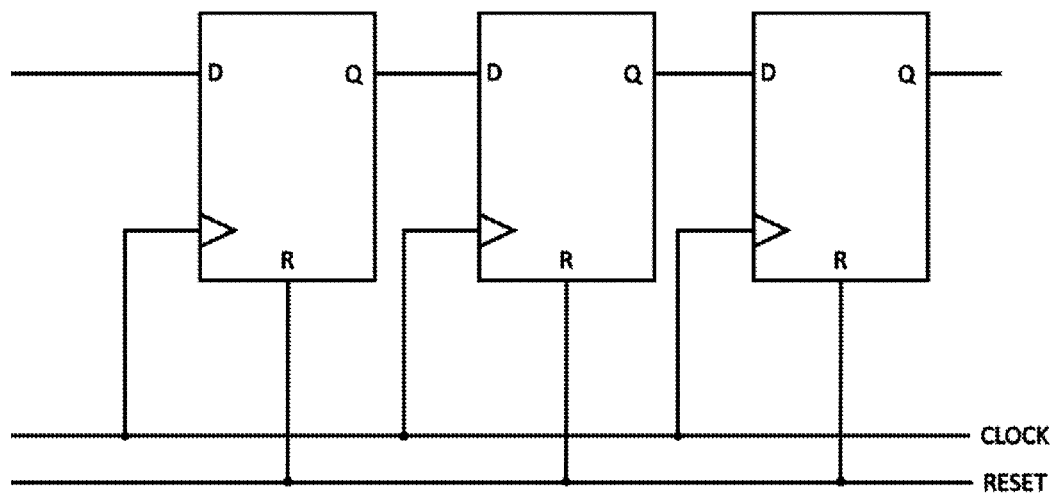
FIG. 13 illustrates a shift register architecture utilized in accordance with an embodiment of the invention.

FIG. 12 shows an example configuration for an IR emitter node 12 in which the command-decoding element 121 and the command-forwarding element 122 have been implemented together as a single flip-flop 1212. The configuration of the IR emitting element 123 is supposed to be similar to what was shown in FIG. 8, in which the polarization circuit 1233 is shared among many IR emitting elements along the ring: as such, it is represented outside the IR emitter node 12. Upon receiving an opportune transition on the clock signal, the flip-flop 1212 outputs on its Q terminal the signal it has as input on its D terminal. When the Q output of the flip-flop 1212 is at an opportune level (for example a logic high level), the switching circuit 1232 connects the IR emitter 1231 to the polarization circuit 1233, causing its activation; on the other hand, when the Q output is at the other level (for example a logic low level), the switching circuit 1232 is open, and the IR emitter 1231 is deactivated. Assuming the ring to be a sequence of IR emitter nodes as those represented in FIG. 12, at each opportune transition of the clock signal, the signal at the Q output of the flip-flop 1212 of an IR emitter node 12 will appear at the Q output of the flip-flop 1212 of the next IR emitter node 12. This is similar to a common implementation of a Single-Input-Single-Output (SISO) shift register, as shown in FIG. 13.

Figure 14:
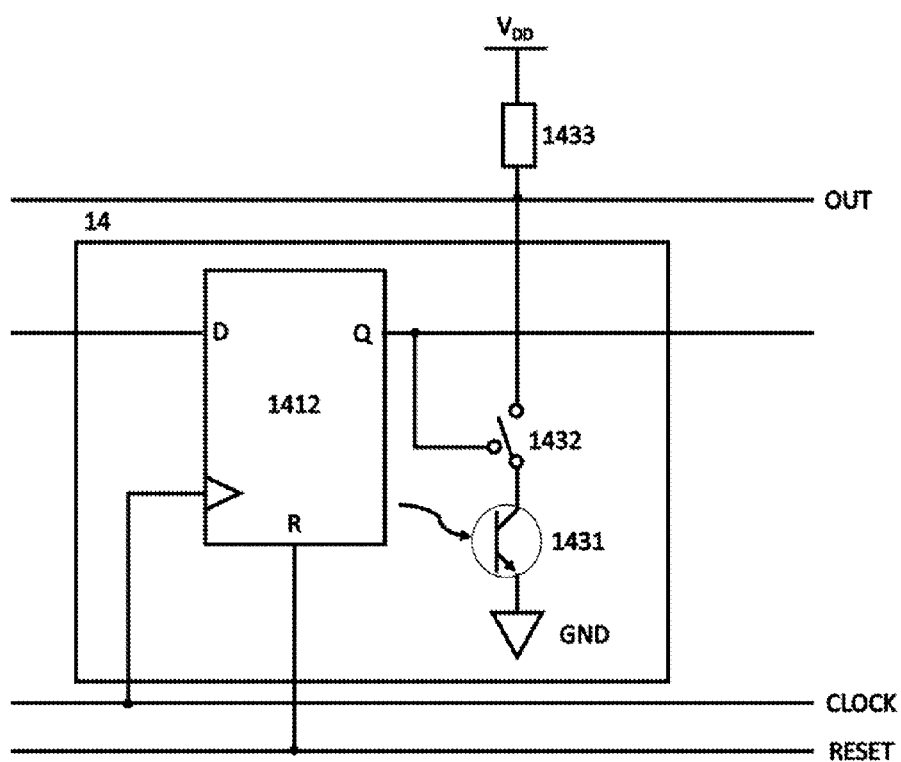
FIG. 14 illustrates a detector node with a command-decoding element and the command-forwarding element.

FIG. 14 shows an example configuration for an IR detector node 14 in which the command-decoding element 141 and the command-forwarding element 142 have been implemented together as a single flip-flop 1412. The configuration of the IR converting element 143 is similar to what was shown in FIG. 11, in which the polarization circuit 1433 is shared among many IR converting elements along the ring: as such, it is represented outside the IR detector node 14. Upon receiving the opportune transition on the clock signal, the flip-flop 1412 outputs on its Q terminal the signal it has as input on its D terminal. When the Q output of the flip-flop 1412 is at an opportune level (for example a logic high level), the switching circuit 1432 connects the IR converting circuit 1431 to the output line: the information from the IR detector node is then available to be read on the ring. On the other hand, when the Q output of the flip-flop 1412 is at the other level (for example a logic low level), the switching circuit 1432 is open, and the IR converting circuit 1431 is not connected to the output line of the ring. Assuming the ring to be a sequence of IR detector nodes, at each opportune transition of the clock signal, the signal at the Q output of the flip-flop 1412 of an IR detector node 14 will appear at the Q output of the flip-flop 1412 of the next IR detector node 14. This is similar to a common implementation of a SISO shift register, as shown in FIG. 13.

In general, the controller node 21 for the ring of IR emitter nodes 12 is able to determine the number of IR emitter nodes 12 connected on its ring, by sending an opportune instruction sequence and analyzing the information returned by the ring. For example, in the case in which the IR emitter nodes 12 are implemented as represented in FIG. 12, the controller node 21 may be able to determine the number of nodes by:
   a. Sending a single high value to the command input (corresponding to the D port of flip-flop 1212) of the first node;
   b. Counting the periods of the clock signal until it receives a single high value from the command output.

Similarly, the controller node 22 for the ring of IR detector nodes 14 is able to determine the number of IR detector nodes 14 connected on its ring by sending an opportune instruction sequence and analyzing the information returned by the ring. For example, in the case in which the IR detector nodes 14 are implemented as represented in FIG. 14, the controller node 22 may be able to determine the number of nodes in a process similar to the one described above.

Figure 15:
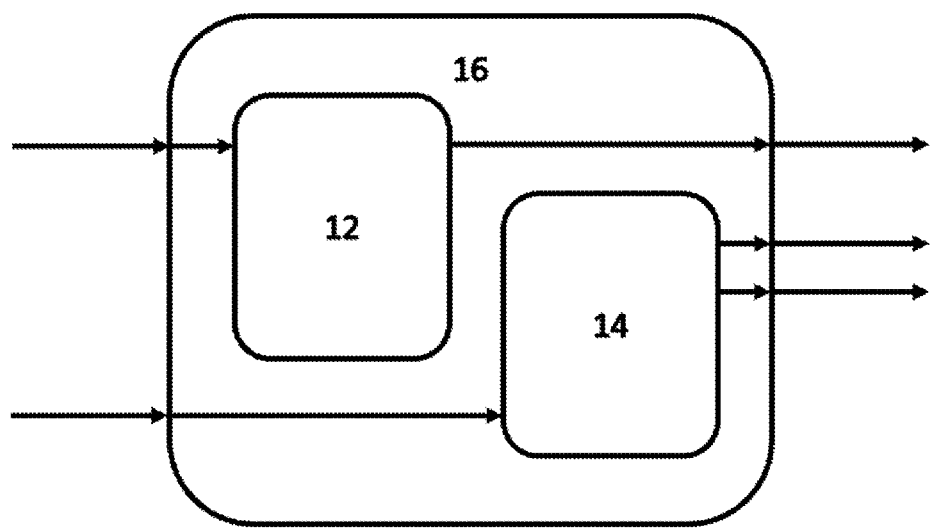
FIG. 15 illustrates a double ring configuration utilized in accordance with an embodiment of the invention.
Figure 16:
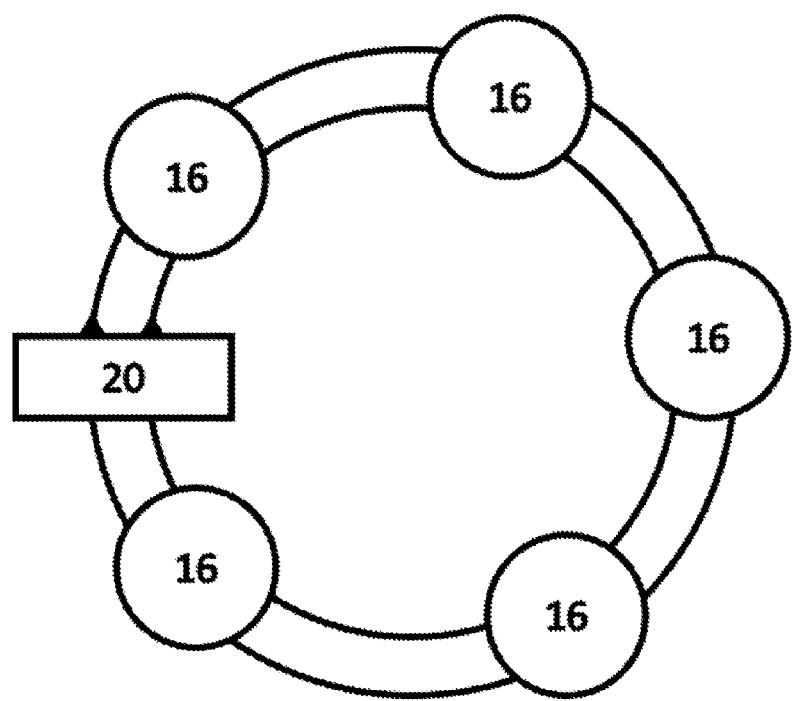
FIG. 16 illustrates a double ring configuration with a single controller.

In many practical implementations of the double ring topology described here, IR emitter nodes 12 and IR detector nodes 14 may be implemented in a single double ring node 16, as shown in FIG. 15. In this case, it would also be practical for the two controller nodes 21 and 22 to be implemented as a single controller circuit 20, as shown in FIG. 16.

In the case described above, in which double ring nodes 16 are used, it is possible to see that, starting from a controller node 20, it is possible to add double ring nodes 16 one after the other seamlessly, and then close the ring by connecting the last double ring node 16 back to the controller node 20. Likewise, it is possible to remove double ring nodes 16 without destroying the ability of the system to operate as long as the ring is closed again afterwards. This is useful in a number of practical cases in which it might be useful to produce the double ring nodes 16 as single modules, and then add as many as are needed in the specific application. This has clear benefits where the cost or complexity of designing and producing a whole system tailored for the specific application would be impractical. If the double ring is implemented as a virtual layer, a ring may be automatically closed upon addition or removal of nodes.

The double ring topology may include processing nodes, either as part of the emitter or detector nodes, or as standalone nodes. These processing nodes may take information from the control nodes, from the emitter nodes and from the detector nodes and perform operations using that information, or part of it. These operations might be useful to reduce the computational load on the control nodes, or on processing units in a larger system that the double ring is a part of. For example, the nodes can normalize the data read with respect to a known bias. Further examples may include, tuning an amplification or signal conditioning stage based on the signals read at previous times, tuning the characteristics of the polarization circuit of a node, or a set of nodes, or all nodes, and deriving some information from a combination of signals read, to ease the computational load from other components of a larger system. In another embodiment, the processing node removes or adds nodes from a double ring implemented as a virtual layer. This may be done in response to the detection of a fault or to change an operational mode.

In the field of optical touch sensors, this architecture allows one to seamlessly scale the size of the system without changing fabrication steps. For different sizes, it is possible to use more or fewer double ring nodes 16, which can be produced simply and easily assembled one to the other. This can allow the production of touch layers of different shapes and form factors, without having the requirement to develop a specific fabrication process. Consequences of this are:

- a clear advantage in terms of cost, because there is no need to develop a different process or plant for different layer sizes;
- an advantage in terms of design options, because shapes, form factors and sizes for the touch layer are not limited to a restricted selection dictated by the usual requirements of the market and, ultimately, the need for a different process for each shape or size.

The disclosed configuration may be used to form a touchscreen that a user controls through gestured applied to the touchscreen. For example, the double ring structure and associated controller may be encased in a deformable material (e.g., a polymer). A user can deploy the touchscreen by reacting to what is displayed. Gestures applied to the touchscreen can provide input to a system. Thus, the touchscreen enables a user to interact directly with what is displayed. Accordingly, the touchscreen may be used in game consoles, personal computers, tablet computers, smartphones, personal digital assistants, satellite navigation devices and electronic books. The deformable material allows for the evaluation of haptic pressure. A non-deformable material may also be used to for position sensing, but not pressure sensing.

A specific example of an application of a touch sensor that would benefit from this architecture is in the automotive space. Supposing one wishes to use an optical touch sensor on a car's dashboard, for each car model one would have a different dashboard, hence one would have to build different touch sensors. Often, this requires modifications of equipment and fabrication tools, at the very least in terms of their configuration, thus an increased cost. By using the architecture proposed here, it would be possible to build double ring nodes 16 and just connect as many as are needed, in the position they are needed, and the controller node 20 would then take care of counting and operating them. The manufacturing of the double ring nodes 16 would be identical for each car model, thus decreasing the costs associated with setting up different production processes or lines.

In sum, the disclosed system has:
- a double ring topology of emitter and detector circuits, where each node includes the emitter (or detector) proper and further circuits to control it and transmit information along the ring;
- a controller with the ability to sit in the double ring topology, count the nodes of either kind, drive each emitter in a known fashion and read from each detector;
- the ability to seamlessly build double rings of any number of nodes, by adding or removing them, without destroying the functionality of the system.

It is also noteworthy that:
- the concepts may be applied to any number of rings having nodes of 1, 2, 3, 4, . . . kinds;
- The nodes could be different from IR emitter or detectors (for example they could be microwave emitters and detectors);
- Implementing in the nodes more advanced functionalities (for example, IR detector nodes might include a circuit to normalize the data read with respect to a given bias).

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a first ring of infrared emitters;
a second ring of infrared detectors positioned within or around the first ring in a stationary relationship with the first ring; and
a controller to apply signals to the first ring and to collect signals from the second ring, wherein the first ring of infrared emitters and the second ring of infrared detectors are encased in a deformable material that allows for the evaluation of haptic pressure.

2. The apparatus of claim 1 wherein the controller is configured to count the number of infrared emitters and the number of infrared detectors added to the first ring of infrared emitters and the second ring of infrared detectors.

3. The apparatus of claim 1 wherein each infrared emitter has a command-decoding element, a command-forwarding element and an infrared emitting element.

4. The apparatus of claim 1 wherein each infrared detector has a command-decoding element, a command-forwarding element and an infrared detecting element.

5. A method, comprising:
forming a serial string of infrared emitters in a first ring;
constructing a serial string of infrared detectors in a second ring;
positioning the first ring within or around the second ring;
attaching at least one controller to the first ring or the second ring; and
encasing the serial string of infrared emitters and the serial string of infrared detectors in a deformable material that allows for the evaluation of haptic pressure and establishes a stationary relationship between the first ring and the second ring.

6. The method of claim 5 further comprising adding an infrared emitter to the first ring and counting with the controller the infrared emitter added to the first ring.

7. The method of claim 5 further comprising adding an infrared detector to the second ring and counting with the controller the infrared detector added to the second ring.

\* \* \* \* \*